(12) United States Patent
Giordano et al.

(10) Patent No.: US 11,501,904 B2
(45) Date of Patent: Nov. 15, 2022

(54) VALVE FOR FLUIDS, PREFERABLY FOR GASES

(71) Applicant: Giordano Controls S.p.A., Villa Bartolomea (IT)

(72) Inventors: Bruno Giordano, Villa Bartolomea (IT); Morgan Giraldo, Codevigo (IT)

(73) Assignee: Giordano Controls S.p.A., Villa Bartolomea (IT)

( * ) Notice: Subject to any disclaimer, the term of this patent is extended or adjusted under 35 U.S.C. 154(b) by 0 days.

(21) Appl. No.: 17/058,080

(22) PCT Filed: May 31, 2019

(86) PCT No.: PCT/IB2019/054519
§ 371 (c)(1),
(2) Date: Nov. 23, 2020

(87) PCT Pub. No.: WO2019/229710
PCT Pub. Date: Dec. 5, 2019

(65) Prior Publication Data
US 2021/0217548 A1     Jul. 15, 2021

(30) Foreign Application Priority Data

May 31, 2018   (IT) .................. 102018000005892

(51) Int. Cl.
*F16K 31/06* (2006.01)
*H01F 7/128* (2006.01)
(Continued)

(52) U.S. Cl.
CPC ............ *H01F 7/128* (2013.01); *F16K 1/443* (2013.01); *F16K 27/029* (2013.01);
(Continued)

(58) Field of Classification Search
CPC ..... Y10T 137/88062; Y10T 137/88046; Y10T 137/87989; Y10T 137/1516; F16K 1/443;
(Continued)

(56) References Cited

U.S. PATENT DOCUMENTS 2,229,826 A  *  1/1941  Thornbery ............. F23N 5/107
                                                          137/66
2,297,854 A  *  10/1942  Alfery ............... G05D 23/1919
                                                          431/54

(Continued)

FOREIGN PATENT DOCUMENTS

WO     2015/111087 A1     7/2015
WO     2017/081774 A1     5/2017

OTHER PUBLICATIONS

International Preliminary Report on Patentability for International Applicaiton No. PCT/IB2019/054519, dated Feb. 14, 2020 in 16 pages.

*Primary Examiner* — Matthew W Jellett
(74) *Attorney, Agent, or Firm* — Knobbe, Martens, Olson & Bear, LLP

(57) ABSTRACT

Valve (1) for fluids, preferably for gases, comprising an inlet passage (2) for a fluid; an outlet passage (3) for the fluid; a shutter (4) interposed between the inlet passage (2) and the outlet passage (3) and movable along a movement direction (L) between an open position and a closed position; first magnetic attraction means (5) operatively active on the shutter (4) for attracting and/or keeping the shutter (4) itself towards the open position; a box-shaped body (7) containing the first magnetic attraction means (5) and extending along the movement direction (L) between an outer face and an inner face with respect to an inner volume (V) of the valve (1) interposed between the inlet passage (2) and the outlet passage (3). The box-shaped body (7) further comprises a
(Continued)

dividing wall (10) for isolating the first magnetic attraction means (5) from the inner volume (V).

20 Claims, 5 Drawing Sheets

(51) Int. Cl.
*F16K 1/44* (2006.01)
*F16K 27/02* (2006.01)
*H01F 7/08* (2006.01)
*H01F 7/16* (2006.01)

(52) U.S. Cl.
CPC ......... *F16K 31/0658* (2013.01); *H01F 7/081* (2013.01); *H01F 7/16* (2013.01); *Y10T 137/1516* (2015.04); *Y10T 137/87981* (2015.04); *Y10T 137/88062* (2015.04)

(58) Field of Classification Search
CPC .... F16K 31/0658; F16K 27/029; H01F 7/128; H01F 7/081; H01F 7/16; H01F 7/1638
See application file for complete search history.

(56) References Cited

U.S. PATENT DOCUMENTS

| | | | | |
|---|---|---|---|---|
| 2,353,848 A * | 7/1944 | Ray | ............... | F16K 31/0658 251/151 |
| 2,409,947 A * | 10/1946 | Mantz | ............... | F23N 5/107 137/66 |
| 2,969,088 A * | 1/1961 | Kramer | ............... | F16K 31/408 137/614.2 |
| 3,021,857 A * | 2/1962 | Davidson | ............... | F16K 31/06 137/66 |
| 5,785,511 A * | 7/1998 | Shah | ............... | F23N 5/107 431/42 |
| 5,979,484 A * | 11/1999 | Grando | ............... | F23N 5/107 137/66 |
| 6,234,189 B1 * | 5/2001 | Koch | ............... | F23K 5/007 137/66 |
| 6,968,853 B2 * | 11/2005 | Amazorrain | ............... | F23N 5/245 137/66 |
| 7,111,642 B2 * | 9/2006 | Takeda | ............... | F23N 1/005 137/614.21 |
| 7,252,109 B2 * | 8/2007 | Colombo | ............... | F23N 5/245 137/66 |
| 8,272,400 B2 * | 9/2012 | Zhang | ............... | F23N 1/005 137/624.11 |
| 2015/0267837 A1 | 9/2015 | Vandenplas et al. | | |

* cited by examiner

VALVE FOR FLUIDS, PREFERABLY FOR GASES

CROSS-REFERENCE TO RELATED APPLICATIONS

This application is the U.S. National Phase under 35. U.S.C. § 371 of International Application PCT/IB2019/054519, filed May 31, 2019, which claims priority to Italian Patent Application No. 102018000005892, filed May 31, 2018. The disclosures of the above-described applications are hereby incorporated by reference in their entirety.

TECHNICAL FIELD

The present invention relates to a valve for fluids. In particular, the present valve is used for intercepting gases at a burner, but could be used in any sector for intercepting, in general, a fluid. Moreover, the present invention relates to a valve of the type having one or more consecutive and independent stages.

PRIOR ART

Solenoid valves are electromechanical components interposed along a pipeline to allow the interception or the adjustment of the flow rate and/or the pressure of a fluid (liquid or gaseous) of interest made to flow in the pipeline. The management of the quantity of fluid passing through the solenoid valve, and therefore along the pipeline, takes place through the control of the movement of a shutter having a high operating precision that allows the solenoid valves to also be used as safety devices.

An example of this type of device is reported in the documents WO2017/081774, WO2015/111087 and WO2015/111088, in which a solenoid valve is illustrated having multiple stages cooperating for the adjustment of the quantity of gas that can be transported through the pipeline.

It should be noted that there are currently two known types of solenoid valves:
- a first type in which at least one part of the shutter is interposed in a volume comprised between magnets;
- a second type in which the shutter is external to the volume comprised between magnets.

The present invention falls under the second type and with reference to the latter, the prior art has a series of drawbacks that the present invention intends to overcome.

In order to isolate their inner volume from the electromagnet and from the external environment, these solenoid valves comprise a surface in resin interposed between the inner volume in which the gas flows and the housing for the coil of the electromagnet. Due to the pressure of the gas acting on the inner face of the solenoid valve and due to the limited physical-chemical resistance that the resin surface is able to guarantee, the gas may enter inside the housing in certain situations or with the passing of time. Obviously, for reasons of safety and security it is essential that the gas does not come into contact with the coil of the electromagnet and/or with the external environment. In fact, once in contact with the filaments of the coil, the gaseous fluids used can be ignited or create explosions that are potentially dangerous for the user and/or for the operation of the components of the solenoid valve.

In addition, according to the prior art, the maintenance of the solenoid valve, with particular reference to the electromagnet, calls for the latter to be removed from the system in which it is installed in order to be disassembled. In fact, in order to be able to inspect the electromagnet it must be removed to be able to access the resin surface, which is removable but facing the inside of the volume of the solenoid valve. This leads to an increase in the necessary maintenance work times and complicates the control procedure.

OBJECT OF THE INVENTION

In this context, the technical task of the present invention is to propose a valve for fluids, preferably for gases, which obviates the drawbacks of the known art as mentioned above.

In particular, an object of the present invention is to provide a valve for fluids able to ensure a high level of safety, and more specifically, able to prevent the gas from coming into contact with the electromagnet.

Another object of the present invention is to provide a valve for fluids in which the electromagnet is easily accessible when maintenance needs arise.

The stated technical task and specified objects are substantially achieved by a valve for fluids, preferably for gases, which comprises the technical features set forth in the independent claim. The dependent claims correspond to further advantageous aspects of the invention.

It should be highlighted that this summary introduces, in simplified form, a selection of concepts which will be further elaborated in the detailed description given below.

The invention relates to a valve for fluids, preferably for gases, which comprises an inlet passage for a fluid, an outlet passage for the fluid, a shutter interposed between these passages and movable along a movement direction between an open position and a closed position. In the open position the shutter allows the flow of the gas from the inlet passage to the outlet passage along a sliding direction, while in the closed position the shutter prevents the flow of the gas.

Furthermore, the valve for fluids comprises first magnetic attraction means operatively active on the shutter for attracting and/or keeping the shutter itself towards the open position and a box-shaped body containing the first magnetic attraction means and extending along the movement direction between an outer face and an inner face with respect to an inner volume of the valve interposed between the inlet passage and the outlet passage.

Preferably, this magnetic attraction means is of the retaining type, i.e. has the function of retaining the shutter, but not inducing the latter to make a first initial movement.

In addition, the box-shaped body comprises a dividing wall arranged between a housing in which the first magnetic attraction means and the inner volume of the valve are positioned.

The dividing wall is arranged outside the dimensions of the first magnetic attraction means according to the movement direction and from the side of the shutter. The shutter is arranged on the opposite side to the first magnetic attraction means with respect to the dividing wall. In this way the magnetic field lines generated by the first magnetic attraction means close on the shutter (to retain it) and a small part of them close on the dividing wall.

Preferably, the dividing wall is formed in a single body (without solutions of continuity) with the box-shaped body or is integrated in a central insert of the box-shaped body that occupies the volume interposed between the first magnetic attraction means, so as to isolate the first magnetic attraction means from the inner volume of the valve.

Advantageously, the pressurised gas that enters the valve remains perfectly confined between the inlet opening and outlet opening, avoiding any losses in the housing of the electromagnet in that it is physically separated from the inner volume of the valve with a dividing wall obtained as a single body together with the box-shaped body, rather than through the interposition of a movable wall.

Preferably, the dividing wall is arranged at the inner face of the box-shaped body to delimit the inner volume with respect to the box-shaped body.

According to one aspect of the invention, the dividing wall faces the shutter when the latter is kept in the open position.

According to another aspect of the invention, the valve comprises an elastic element interposed between the dividing wall and the shutter to facilitate the movement of the shutter itself from the open position to the closed position.

Advantageously, in this way, the dividing wall and the shutter are able to each define a surface for supporting a spring, or an equivalent elastic element, useful for facilitating the distancing of the shutter from the box-shaped body to move from the open configuration to the closed configuration.

According to a further aspect of the invention, the outer face of the box-shaped body comprises a removable bottom to facilitate access from the external environment to the housing in which the first magnetic attraction means is arranged.

Advantageously, when maintenance needs arise or for the simple inspection of the electromagnet, it is sufficient to remove the bottom of the box-shaped body placed at the outer face. In this way, the housing containing the electromagnet is accessible from the outside and it is not necessary to disassemble the entire valve.

Preferably, the first magnetic attraction means comprises an electromagnet configured to generate magnetic field lines able to attract the shutter into the open position and keep it in such position.

Advantageously, the use of an electromagnet capable of generating a magnetic field having a specific intensity allows moving the shutter from the closed position to the open position and keeping it in this position.

According to one aspect of the invention, the box-shaped body has a hole communicating with the housing for allowing the passage of at least one cable between the housing and the external environment.

Advantageously, the presence of a hole, for example on the outer wall of the box-shaped body, allows connecting via at least one electric cable the electromagnet with a suitable electromagnetic circuit arranged outside the valve and able to manage the magnetic field produced.

According to another aspect of the invention, the shutter comprises a first plate and a second sealing plate. The first plate defines a support surface for the shutter on the inner face when the shutter is in the open position, while the second sealing plate prevents the flow of fluid between the inlet passage and the outlet passage when the shutter is in the closed position.

Preferably, the shutter is made at least partly of a magnetic and/or ferromagnetic material.

Advantageously, in this way, the shutter reacts to the magnetic field produced by the electromagnet with greater ease.

According to one aspect of the invention, the valve comprises a movement member for moving the shutter. Specifically, the movement member is movable along the movement direction and is operatively associated with the shutter for moving it from the closed position towards the open position.

The movement member is advantageously arranged opposite the box-shaped body with respect to the shutter, in such a way that the movement member, with the aid of the magnetic field induced by the electromagnet, is able to move the shutter from the closed position to the open position, while the elastic element interposed between the shutter and the dividing wall is able to let the shutter carry out the opposite movement.

Preferably, the valve comprises second magnetic attraction means operatively active between a fixed portion of the valve and the movement member for moving the latter along the movement direction.

Similarly to the first magnetic attraction means, the second magnetic attraction means generates a magnetic field able to move the movement member arranged in the immediate vicinity.

According to one aspect of the invention, the valve comprises a through cavity interposed between the inlet passage and the outlet passage. The through cavity extends along the movement direction to be facing towards the shutter. Specifically, the through cavity comprises a further inlet passage in fluid communication with the inlet passage of the valve and a further outlet passage in fluid communication with the outlet passage of the valve. More precisely, the further inlet passage and the further outlet passage are arranged along the movement direction transversally to the inlet passage and the outlet passage of the valve, which are arranged along the sliding direction.

Preferably, the movement member is inserted in the through cavity to allow the movement thereof along the movement direction.

A valve comprises two stages, wherein at least a first stage has at least any one of the features previously introduced.

Preferably, as shown in FIG. 2, the second stage of the valve comprises a further shutter movable along the movement direction between a locking position (not shown) and a sliding position (FIG. 2). In the locking position the further shutter disables the passage of fluid between the through cavity and the outlet opening of the valve, while in the sliding position the further shutter is distanced from the further outlet passage to allow the fluid to reach the outlet opening.

Preferably, moreover, the movement member is common to both of the shutters and is configured to move the shutter and the further shutter.

Advantageously, the movement member is configured to be able to move the shutter and the further shutter, each independently with respect to the other, so as to be able to obtain every possible configuration of the positioning of the shutters according to need.

According to one aspect of the invention, the movement member comprises a rod-shaped body passing through the further shutter and a ferromagnetic portion interacting with the second magnetic attraction means.

Preferably, the valve comprises a first electromagnetic circuit operatively connected to the first magnetic attraction means and a second electromagnetic circuit operatively connected to the second magnetic attraction means. The first electromagnetic circuit and the second electromagnetic circuit are independent of each other in such a way that the movement of the further shutter along the movement direction is independent from the movement of the shutter, which is also movable along the movement direction.

BRIEF DESCRIPTION OF THE DRAWINGS

Additional features and advantages of the present invention will become more apparent from an approximate, and thus non-limiting, description of a preferred, but non-exclusive embodiment of a valve for fluids, preferably for gases, as illustrated in the appended drawings, in which.

With reference to the drawings, they serve solely to illustrate embodiments of the invention with the aim of better clarifying, in combination with the description, the inventive principles at the basis of the invention.

DETAILED DESCRIPTION OF PREFERRED EMBODIMENTS OF THE INVENTION

The present invention relates to a valve for fluids, preferably for gases.

With reference to the figures, a valve for fluids, preferably for gases, has been generically indicated with the number 1.

The other numerical references refer to technical features of the invention which, barring indications otherwise or evident structural incompatibilities, the person skilled in the art will know how to apply to all the variant embodiments described.

Any modifications or variants which, in the light of the description, are evident to the person skilled in the art, must be considered to fall within the scope of protection established by the present invention, according to considerations of technical equivalence.

Figure 1:
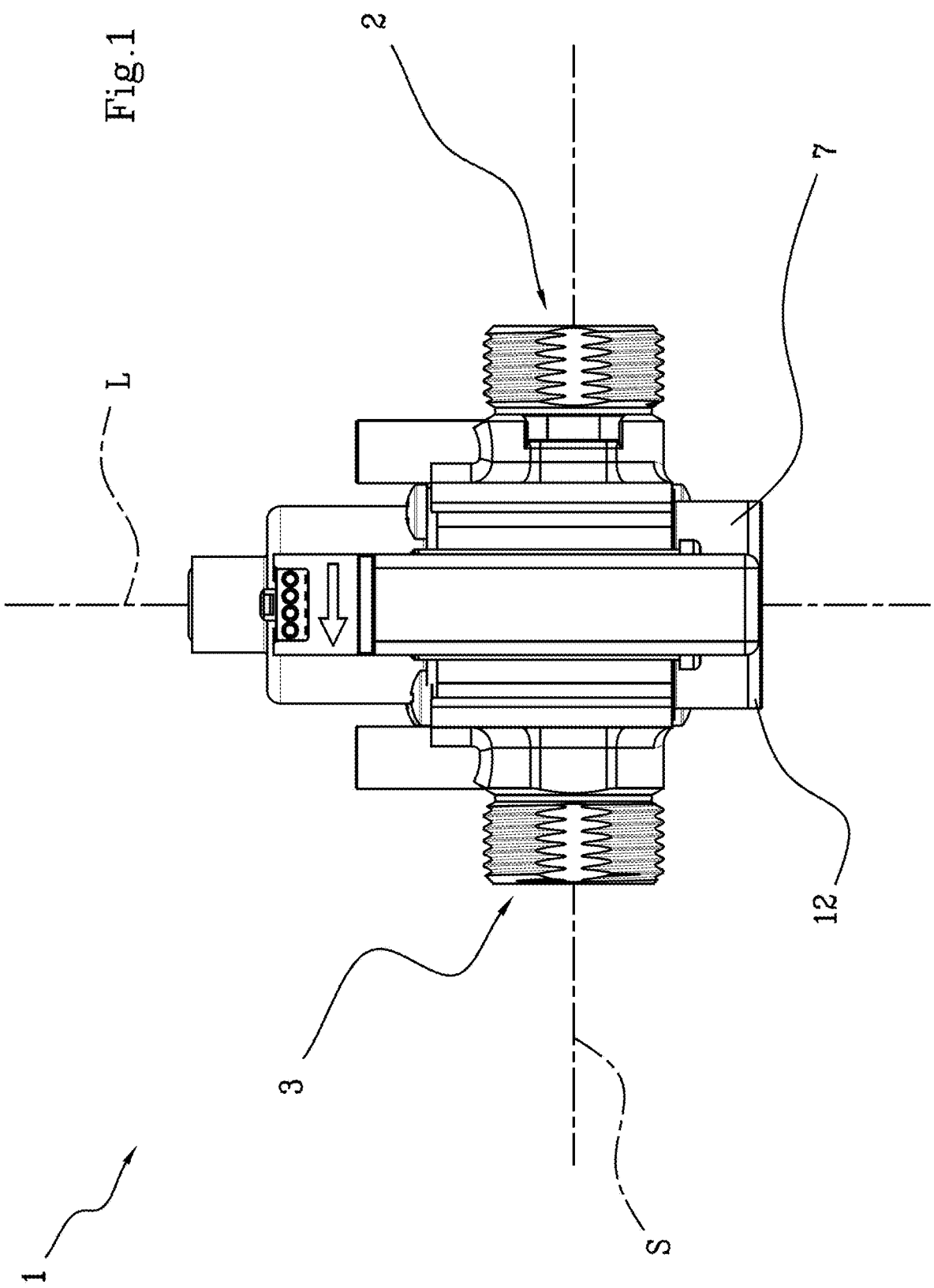
FIG. 1 shows a front view of a valve for fluids.

FIG. 1 illustrates a valve 1 for fluids, preferably for gases, comprising two consecutive and independent stages, which manage the passage of the predetermined fluid through the valve 1.

Figure 2:
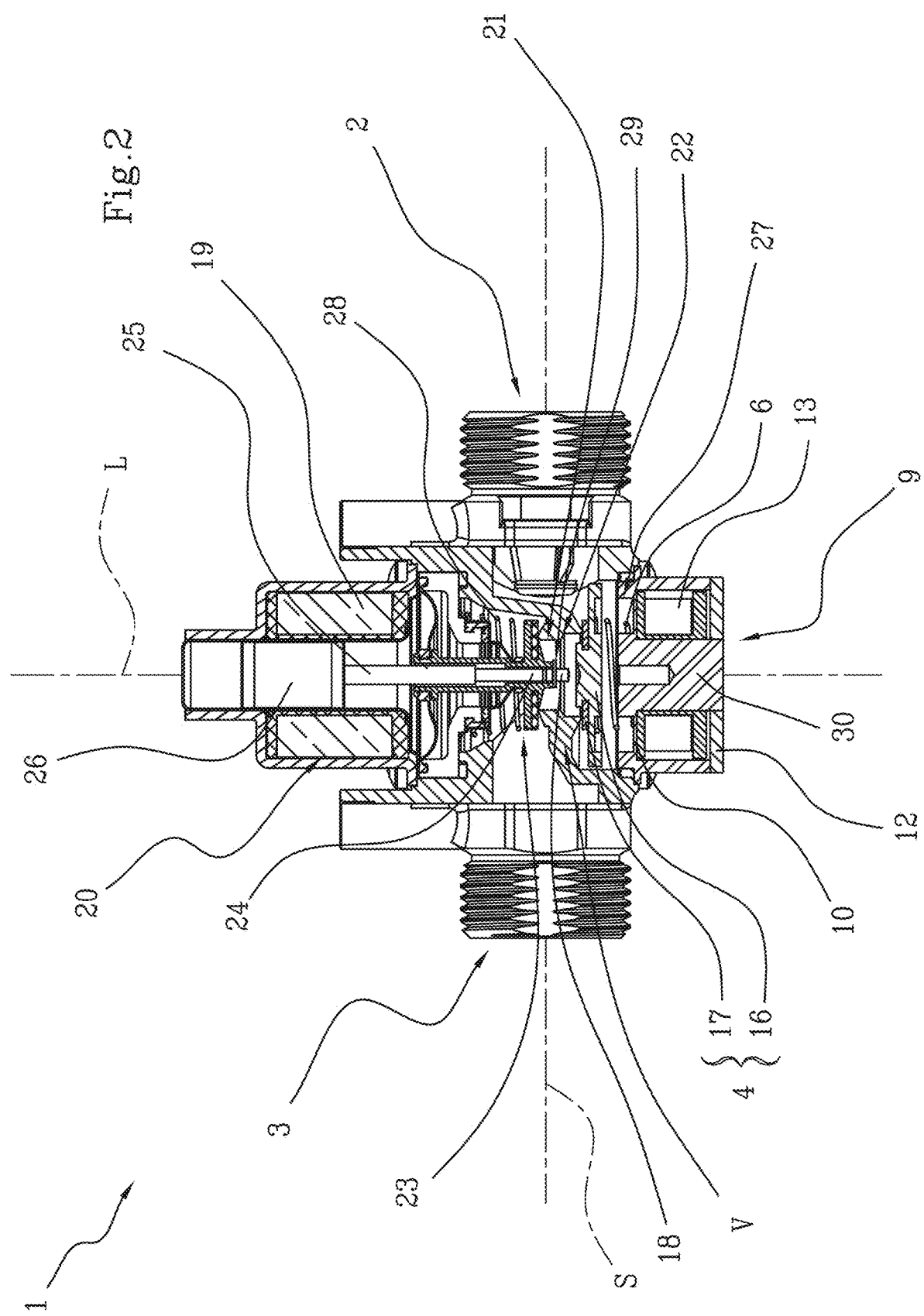
FIG. 2 shows a front view of a section of the valve for fluids according to a transverse plane.

The first stage of the valve 1, as shown in FIG. 2, comprises an inlet passage 2 for a fluid, an outlet passage 3 for the same fluid, a shutter 4 interposed between these passages 2,3 and movable along a movement direction L between an open and a closed position. In the open position the shutter 4 allows the flow of the gas from the inlet passage 2 to the outlet passage 3 along a sliding direction S, while in the closed position the shutter 4 prevents the flow of the gas.

Furthermore, the valve comprises first magnetic attraction means 5 of the retaining type operatively active on the shutter 4 for maintaining the shutter 4 itself towards the open position and a box-shaped body 7 containing the first magnetic attraction means 5 and extending along the movement direction L between an outer face 9 and an inner face 8 with respect to an inner volume V of the valve 1 interposed between the inlet passage 2 and the outlet passage 3.

It should be noted that the first magnetic attraction means 5 is configured to generate magnetic field lines at the shutter 4 and are closed through the shutter 4 in the open position.

It should be noted that the first magnetic attraction means 5 is configured to generate magnetic field lines outside the dimensions of the first magnetic attraction means 5 according to the movement direction L and towards the inner volume V.

Figure 4:
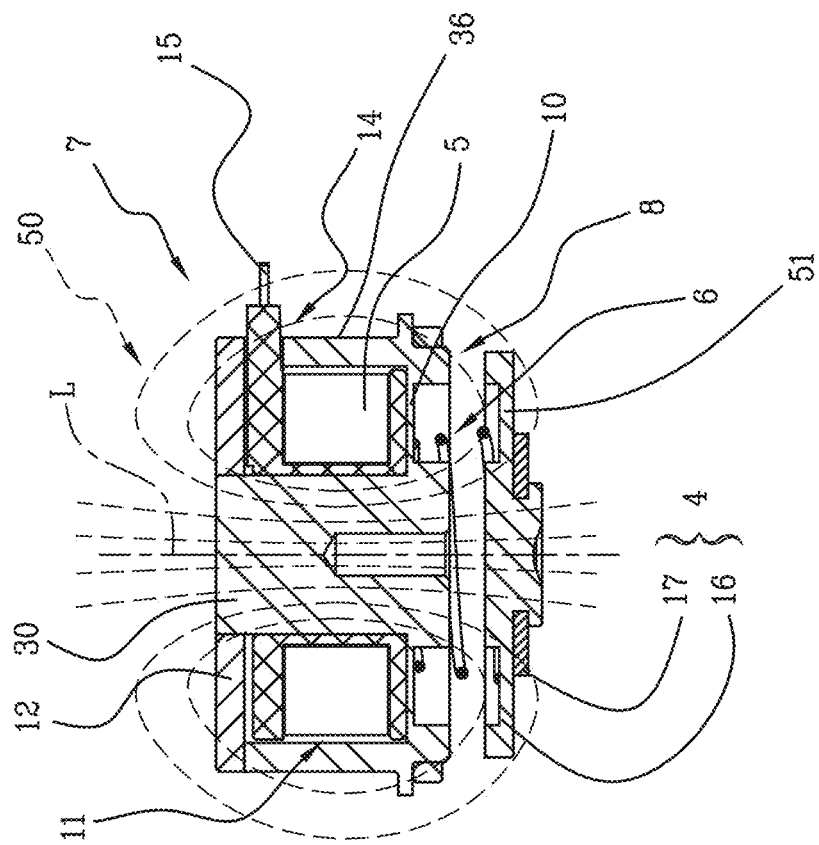
FIGS. 3 and 4 show a side view according to a section taken along the plane A-A of the electromagnet of the solenoid valve whose shutter is in the closed position.
Figure 6:
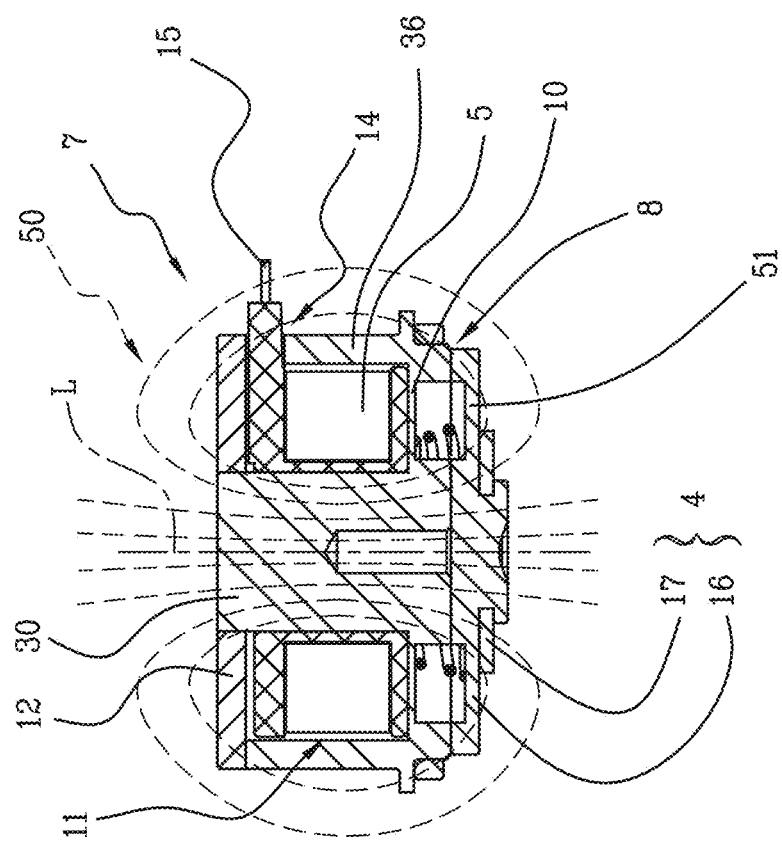
FIGS. 5 and 6 show a side view according to a section taken along the plane B-B of the electromagnet of the solenoid valve whose movable plate is in the open position.

According to one aspect of the invention, shown in FIGS. 4 and 6, the shutter 4 is made at least partly of a magnetic and/or ferromagnetic material. In this way, the shutter 4 is traversed by a transverse component 50 of the magnetic field lines with respect to the movement direction L. This transverse component 50 extends beyond the dividing wall 10 so as to interact with the shutter 4 when it is in the open position and in the closed position.

According to another aspect of the invention, shown in FIGS. 4 and 6, the shutter 4 has a lateral portion 35 thereof that overlaps a geometric protrusion 51 of the magnet 5 on a plane passing through the shutter 4 and orthogonal to the movement direction L. In particular, the lateral portion 35 is at least partly made of a magnetic and/or ferromagnetic material.

Preferably, the box-shaped body 7 comprises an insert 30, preferably metallic, interposed between the magnetic attraction means 5 in order to centrally convey the flow lines of the magnetic field. In other words, the field lines pass inside the insert 30 and are closed through the shutter 4 when it is arranged in the open position.

In addition, the box-shaped body 7 comprises a dividing wall 10 arranged between a housing 11 in which the first magnetic attraction means 5 and the inner volume V of the valve 1 are positioned.

The dividing wall 10 is arranged outside the dimensions of the first magnetic attraction means 5 according to the movement direction L. In addition, the shutter 4 is arranged on an opposite side to the first magnetic attraction means 5 with respect to the dividing wall 10.

According to one aspect of the invention, the dividing wall 10 is made of metallic material, preferably ferromagnetic material.

Preferably, the dividing wall 10 is afforded in a single body or without solutions of continuity with the box-shaped body 7 or with the central insert 30 of the box-shaped body 7 that occupies the volume interposed between the first magnetic attraction means 5, so as to isolate the first magnetic attraction means 5 from the inner volume V of the valve 1.

Figure 7:
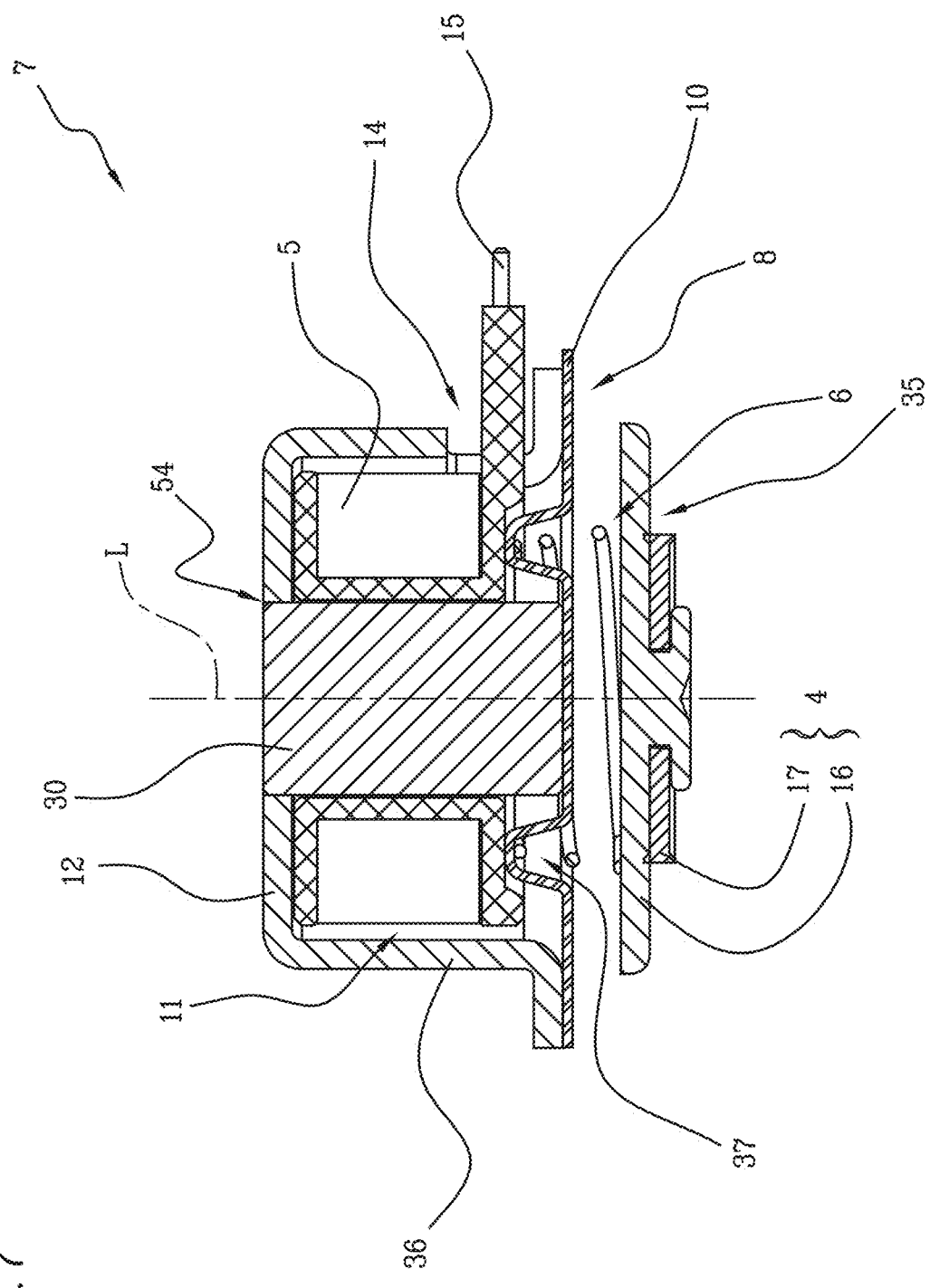
FIG. 7 shows a side view of a section of the valve for fluids according to a further embodiment.

Alternatively, as shown in FIG. 7, the dividing wall 10 is a separate element with respect to the box-shaped body 7. In particular, the dividing wall 10 is a plate made of metallic material, preferably ferromagnetic material, to allow the transmission of the electromagnetic field produced by the magnetic attraction means 5 towards the shutter 4. Advantageously, any loss of intensity of the magnetic field (due to the absorption induced by the metallic material of the dividing wall 10) is limited thanks to the thinness of the dividing wall 10. Therefore, the dividing wall 10 does not substantially reduce the attractive effect of the magnetic attraction means 5 on the shutter 4 to lead it or keep it in the open position.

According to the aspect shown in FIG. 7, the dividing wall 10 substantially extends along the plane of separation of the box-shaped body 7 from the inner volume V of the valve 1. In other words, the dividing wall 10 defines the movement limit of the shutter 4 from the closed position, in which it is distanced, to the open position, in which it is in contact with the dividing wall 10 but at least partly outside the box-shaped body 7 and therefore not entirely interposed between the magnetic attraction means 5 or not fully superposed on the metallic insert 30. In both the closed position and the open position, the shutter is immersed in the magnetic field lines to interact with them and be moved.

Preferably, as shown in FIG. 7, the dividing wall 10 has a concave portion 37 which partially surrounds the insert 30 so as to render the positioning of the same dividing wall 10 more stable between the box-shaped body 7 and the shutter 4.

In addition, as better explained hereinafter, the concave portion 37 is also configured to receive and hold in position an elastic element 6 interposed with the shutter 4 and configured to move it towards the closed position.

According to one aspect of the invention, the box-shaped body 7 comprises an outer wall 36 made of ferromagnetic material such as to convey the magnetic field lines generated by the magnetic attraction means 5 towards the dividing wall 10.

It should be noted that said box-shaped body 7 defines as a whole a portion of the valve 1 separated from the rest of the valve 1.

During its maintenance in the open position, the shutter 4 defines a connecting "bridge" between the poles of the first magnetic attraction means 5.

Preferably the inlet opening 2 and outlet opening 3 are arranged facing each other along a sliding direction S of the fluid through the valve 1.

Specifically, a through cavity 21 (better shown in FIG. 2) is interposed between the passages 2,3 of the valve 1 and extends along the movement direction L to be facing towards the shutter 4. The through cavity 21 comprises a further inlet passage 22 in fluid communication with the inlet passage 2, and a further outlet passage 23 in fluid communication with the outlet passage 3.

In the configuration in which the valve 1 allows being crossed by the fluid between the inlet opening 2 and the outlet opening 3, therefore, the passage of the fluid will follow a path divided into three parts.

The first stretch is along the sliding direction S, between the inlet passage 2 and the further inlet passage 22.

Then, the second stretch crosses the through cavity 21 along the movement direction L, in a manner substantially transverse to the sliding direction S.

Finally, the third stretch is along the sliding direction S between the further outlet passage 23 and the outlet passage 3.

Figure 3:
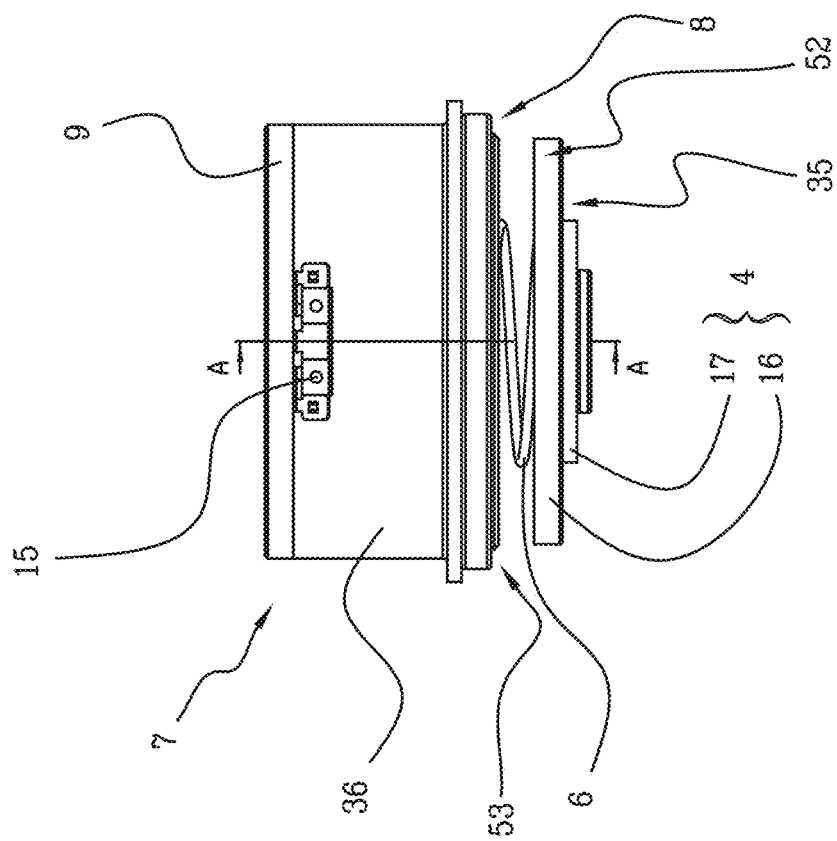

Preferably, the shutter 4 and the box-shaped body 7 are arranged consecutively to the through cavity 21 along the movement direction L. The shutter 4, movable along this direction, is advantageously able to place itself in abutment against the further inlet passage 22 to prevent the flow of the gas towards the outlet passage 3 of the valve 1 (closed position shown in FIG. 5 and in FIG. 6). Alternatively, as shown in FIG. 3 and in FIG. 4, the shutter allows the flow of the gas when it is in the open position, that is, distanced from the further inlet passage 22 along the movement direction L.

Figure 5:
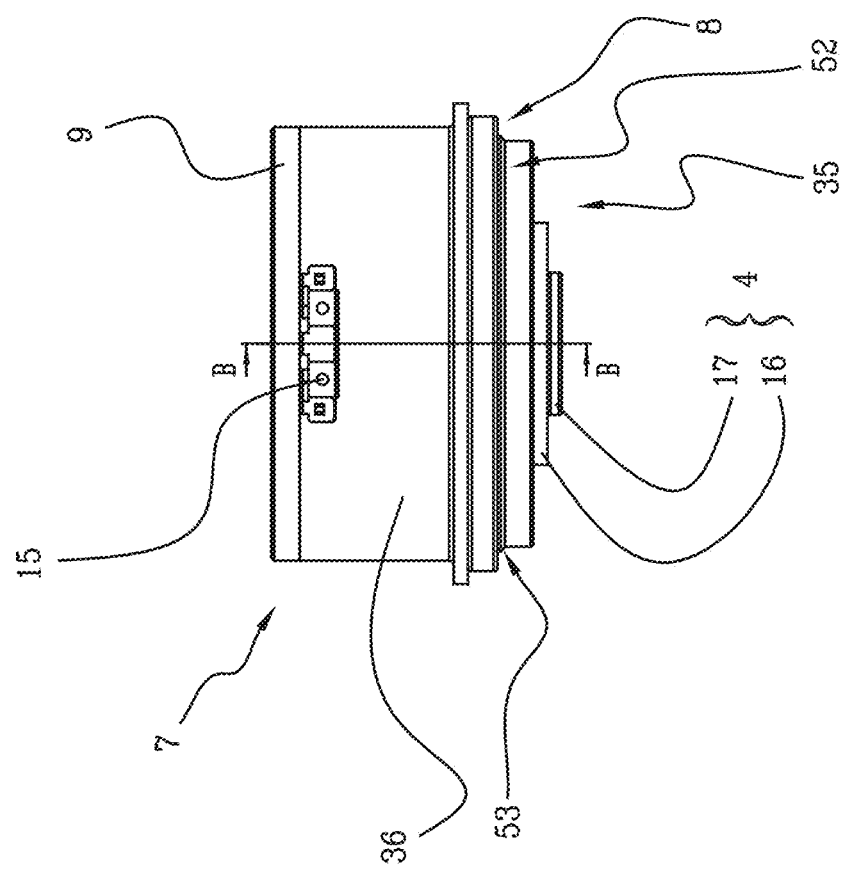

Preferably, as better visible in FIGS. 4 and 6, the shutter 4 has a substantially plate-shaped conformation and extends orthogonally to the movement direction L. More precisely, as shown in FIGS. 3 and 5, the shutter 4 has a surface extension 52 substantially equal to the transverse section 53 of the box-shaped body 7 with respect to a movement direction L. In other words, the shutter 4 has a lateral portion 35 which extends up to the protrusion of the outer wall 36 of the box-shaped body 7 parallel to the movement direction L.

Advantageously, thanks to the large contact surface between the shutter 4 and the box-shaped body 7, mainly the dividing wall 10 and the outer wall 36, the maintenance of the shutter 4 in the open position requires that the magnetic attraction means 5 provides little energy through the magnetic field lines.

According to one aspect of the invention, the shutter 4 comprises a first plate 16, which defines a support surface of the shutter 4 on the inner face 8 of the box-shaped body 7, when the shutter 4 is in the open position.

In addition, the shutter 4 comprises a second sealing plate 17 for preventing the flow of fluid between the inlet passage 2 and the outlet passage 3, when the shutter 4 is in the closed position.

Specifically, the first plate 16 is arranged towards the inner face 8 of the box-shaped body 7, while the second sealing plate 17 is facing towards the further inlet passage 22 of the through cavity 21.

Preferably, the first plate 16 is made of magnetic and/or ferromagnetic material, while the second plate 17 is made of rubber material and has an annular shape so as to be able to fit into a special seat on the first plate 16.

According to one aspect of the invention, the shutter 4 is made of at least two pieces bound together and integral during movement between the open position and the closed position. In other words, the pieces that compose the shutter 4 are not mutually movable between them.

According to one aspect of the invention, the shutter 4 is completely immersed inside the magnetic field lines generated by the magnetic attraction means 5 to interact directly with them, both in the closed position and the open position.

Advantageously, therefore, in the closed position the shutter 4 (immersed in the magnetic field lines) is able to be drawn into the open position by the magnetic attraction means 5, placing itself in contact with the dividing wall 10.

The shutter 4, at least in part, is arranged on the outside of the box-shaped body 7 and totally beyond the magnetic attraction means 5 according to the movement direction L.

According to one aspect of the invention, the box-shaped body 7 is partially inserted in the main volume V of the valve 1, in such a way that its inner face 8 is inside the valve 1 and its outer face 9 is outside the valve 1 to be more easily accessible to a user during inspection and/or maintenance operations.

Specifically, the inner face 8 and the outer face 9 are both arranged along the movement direction L, opposite with respect to the outer wall 36 of the box-shaped body 7, which preferably has a circular cross section.

Preferably, the outer face 9 of the box-shaped body comprises a removable bottom 12 to further facilitate access from the external environment to the housing 11 in which the first magnetic attraction means 5 is arranged.

Preferably, this removable bottom 12 is made of metallic material.

In the preferred embodiment the removable bottom 12 is a washer having a central hole 54 (shown in FIG. 7) in which a surface of the central insert 30 of the box-shaped body 7 is inserted. Preferably, the removable bottom 12 is realised in a single body with the vertical walls of the box-shaped body 7.

The housing 11 is defined between the removable bottom 12 and the dividing wall 10, which can be realised in a single body or without solutions of continuity with the box-shaped body 7, i.e. as a single body with the box-shaped body 7, to prevent any leakage of gas from the inner volume V of the valve 1 towards the box-shaped body 7 and/or the environment outside the valve 1.

Consequentially, the dividing wall 10 is arranged at the inner face 8 of the box-shaped body 7 to delimit the inner volume V with respect to the box-shaped body 7 itself. In this way, the dividing wall 10 faces the shutter 4 when the shutter 4 is kept in the open position.

More precisely, the dividing wall 10 is arranged inside the box-shaped body 7, substantially parallel to the removable bottom 12 and the shutter 4.

According to one aspect of the invention shown in FIGS. 4 and 6, the inside of the box-shaped body 7 has a cylinder that extends along the movement direction L and that gives the housing 11 a hollow cylinder shape.

Moreover, the dividing wall 10 and the portion of the cylinder outside the housing 11 define a seat 27 suitable for the arrangement of an elastic element 6, which is useful for facilitating the movement of the shutter 4 from the open position to the closed position.

Preferably, the elastic element 6 is a spring having a specific elastic constant. The spring is interposed at the contact between the dividing wall 10 and the shutter 4.

Preferably, the seat 27 is recessed relative to the inner face 8 of the box-shaped body 7. Moreover, this seat 27 preferably has a circular contour.

Advantageously, the shape of the housing 11 allows stably placing the first magnetic attraction means 5 therein.

According to one aspect of the invention, the first magnetic attraction means 5 comprises an electromagnet 13 configured to generate magnetic field lines having a suitable intensity to attract the shutter 4 into the open position and keep it in such position.

Preferably, the electromagnet 13 is a coil consisting of a plastic reel containing a copper winding, whose electrical contacts are connected to a first electromagnetic circuit arranged outside the box-shaped body 7.

As shown in FIGS. 3 to 6, the box-shaped body 7 has a hole 14 communicating with the housing 11 for allowing the passage of at least one cable 15 of the coil between the housing 11 itself and the external environment.

Preferably, the hole 14 is afforded on a portion of the outer wall 36 of the box-shaped body 7.

According to one aspect of the invention, the valve 1 comprises a movement member 18 movable along the movement direction L, which is operatively associated with the shutter 4 for moving it from the closed position towards the open position.

Specifically, the movement member 18 acts on the side of the shutter 4 opposite that facing the inner face 8 of the box-shaped body 7.

Even more specifically, the movement member 18 interacts with a portion of the shutter 4 facing towards the through cavity 21, since the movement member 18 itself is inserted through the through cavity 21 to be free to move along the movement direction L.

The movement of the movement member 18 is obtained by second magnetic attraction means 19 operatively active between a fixed portion 20 of the valve 1 and the movement member 18 itself, for moving the latter along the movement direction L.

Alternatively, the movement member 18 can be a pneumatic actuator or a hydraulic pusher or a manual movement means or any other means not expressly described here but having an equivalent function.

According to one aspect of the invention, the second magnetic attraction means 19 is arranged along the movement direction L opposite the first magnetic attraction means 5 with respect to the movement member 18.

In particular, the second magnetic attraction means 19 acts at one end of the movement member 18 opposite the end of the same member that acts on the shutter 4.

As shown in the accompanying figures, the valve 1 has a second stage comprising a further shutter 24 movable along the movement direction L between a locking position and a sliding position.

In the locking position the further shutter 24 disables the passage of gas between the through cavity 21 and the outlet opening 3, while in the sliding position the shutter 4 is distanced from the further outlet passage 23 to allow the gas to reach the outlet opening 3.

Advantageously, the movement member 18 is common to both shutters 4,24 and is configured to move the shutter 4 and the further shutter 24.

Even more advantageously, the movement member 18 comprises a rod-shaped body 25 and a ferromagnetic portion 26 interacting with the second magnetic attraction means 19 for moving the rod-shaped body 25 along the movement direction L.

According to one aspect of the invention, the rod-shaped body 25 has a first end connected to the ferromagnetic portion 26 and a second end adapted to collide with the shutter 4 to move it from the closed position to the open position. On the rod-shaped body 25, more precisely on a portion comprised between the second end and the further shutter 24, there is an abutment 29 able to abut against the further shutter 24 to move it along the movement direction L from the locking position to the sliding position.

A further elastic element 28 is able to move the further shutter 24 from the sliding position to the locking position when the abutment 29 of the rod-shaped body 25 does not exert an opposite force to hold it in position.

The further elastic element 28 is interposed between the further shutter 24 and a portion of the valve 1 facing towards the second magnetic attraction means.

According to one aspect of the invention, the valve 1 comprises a second electromagnetic circuit operatively connected to the second magnetic attraction means 19 distinct from the first electromagnetic circuit operatively connected to the first magnetic attraction means 5. The first and the second electromagnetic circuits are independent of each other in such a way that the movement of the further shutter 24 along the movement direction L is also independent from the movement of the shutter 4 along the same movement direction L.

With regard to an operating example of the valve 1 for fluids, preferably for gases, it derives directly from what is described above which is referred to below.

Under normal conditions, the shutter 4 is in the closed position due to the elastic element 6, while the further elastic element 28 keeps the further shutter 24 in the locked position.

In this condition the gas is able to flow from the inlet passage 2 only to the portion of the inner volume V comprised between the shutter 4 and the inner face 8 of the box-shaped body 7, i.e. where the elastic element 6 is located.

The activation of the second magnetic attraction means 19 allows the movement of the movement member 18 along the movement direction L. When the second end of the rod-shaped body 25 collides with the shutter 4, the latter moves from the closed position towards the open position along the movement direction L. At a certain distance from the inner face 8, the field lines generated by the first magnetic attraction means 5 are able to interact with the first plate 16 of the shutter 4, causing it to complete its stroke up to abutting in the open position in which it is kept.

Advantageously, the rod-shaped body 25 passes through the further shutter 24 thanks to a suitable cavity present on the latter, so that this process does not interfere with the positioning of the further shutter 24.

In this configuration the gas is able to flow inside the through cavity 21, in which it meets obstacle of the further shutter 24 in the locked position.

Finally, during the maintenance of the shutter 4 in the open position by the first magnetic attraction means 5, the second magnetic attraction means 19 moves the movement member 18 along the movement direction L away from the box-shaped body 7. In this way, the abutment 29 present on the rod-shaped body 25 allows the movement of the further shutter 24 from the locking position to the sliding position, counteracting the force exerted by the further elastic element 28 on the further shutter 24 to hold it in the locking position.

Preferably, the abutment 29 is a circular ring with a greater section of the cavity of the further shutter 24.

In this configuration the gas is able to flow up to the outlet passage 3 from the through cavity 21.

Advantageously, the positioning of the shutter 4 is independent from the positioning of the further shutter 24, therefore a possible configuration of the valve provides that the shutter 4 is in the closed position during the movement of the further shutter 24 from the locking position to the sliding position, in such a way as to only allow the gas contained in the through cavity 21 to flow outside the valve 1 through the outlet passage 3.

Advantageously, the invention allows making the device safer during use, as the dividing wall is an integral part of the body containing the first electromagnet and therefore cannot be penetrated by the gas.

Moreover, the present invention allows an easy replacement of the electromagnet since there is an opening on the outer face of the valve.

What is claimed is:

1. A valve for fluids or gases, comprising:
an inlet passage for a fluid;
an outlet passage for the fluid;
a shutter interposed between the inlet passage and the outlet passage and movable along a movement direction (L) between an open position, in which it allows the flow of the fluid from the inlet passage to the outlet passage along a sliding direction (S), and a closed position, in which it prevents the flow of fluid;
a first magnet of the retaining type operatively active on the shutter for attracting and/or keeping the shutter itself towards the open position; said first magnet being configured to generate magnetic field lines at the shutter;
a box-shaped body containing the first magnet and extending along the movement direction (L) between an outer face and an inner face with respect to an inner volume (V) of the valve interposed between the inlet passage and the outlet passage;
wherein said box-shaped body comprises a dividing wall made of ferromagnetic material and arranged between the inner volume (V) and a housing in which the magnet first is positioned; said dividing wall being arranged outside the dimensions of the first magnet according to the movement direction (L), and said shutter being arranged on an opposite side to the first magnet with respect to the dividing wall so as to prevent the gas from coming into contact with the first magnet; said shutter being at least partly made of a magnetic and/or ferromagnetic material so as to be traversed by a transverse component of said magnetic field lines with respect to the movement direction (L) and extending beyond said dividing wall so that said transverse component interacts with the shutter between the open position and the closed position wherein said shutter has a lateral portion thereof that overlaps a geometric protrusion of the magnet on a plane passing through the shutter and orthogonal to the movement direction (L); said lateral portion being at least partly made of a magnetic and/or ferromagnetic material, wherein said dividing wall is afforded in a single body without solutions of continuity with the box-shaped body or with a central insert of the box-shaped body that occupies the volume interposed between the first magnet, so as to isolate the first magnet from the inner volume (V), and wherein no mechanical movable element penetrates the dividing wall.

2. The valve according to claim 1, wherein the box-shaped body comprises an outer wall made of ferromagnetic material so as to convey the field lines towards the dividing wall.

3. The valve according to claim 1, wherein said shutter extends orthogonally to the movement direction (L) and has a surface extension substantially equal to a transverse section of said box-shaped body with respect to said movement direction (L).

4. The valve according to claim 1, wherein said shutter is made of at least two pieces constrained to each other and integral with the movement of the shutter.

5. The valve according to claim 1, wherein the dividing wall is arranged at the inner face of the box-shaped body to delimit the inner volume (V) with respect to the box-shaped body.

6. The valve according to claim 1, wherein the dividing wall faces the shutter, when the latter is kept in the open position.

7. The valve according to claim 1, comprising an elastic element interposed between the dividing wall and the shutter to facilitate the movement of the shutter from the open position to the closed position.

8. The valve according to claim 1, wherein the outer face of the box-shaped body comprises a removable bottom to allow access from the external environment to the housing in which the first magnet is arranged.

9. The valve according to claim 1, wherein the first magnet comprises an electromagnet configured to generate magnetic field lines able to attract the shutter into the open position and keep it in such position.

10. The valve according to claim 1, wherein said box-shaped body has a hole communicating with the housing for allowing the passage of at least one cable between the housing and the external environment.

11. The valve according to claim 1, wherein the shutter comprises a first plate, which defines a support surface for the shutter on the inner face when the shutter is in the open position, and a second sealing plate to prevent the flow of fluid between the inlet passage and the outlet passage when the shutter is in the closed position.

12. The valve according to claim 1, comprising a movement member for moving the shutter along the movement direction (L) and operatively associated with the shutter for moving it from the closed position towards the open position.

13. The valve according to claim 12, comprising a second magnet operatively active between a fixed portion of the valve and the movement member for moving the movement member itself along the movement direction (L).

14. The valve according to claim 1, comprising a through cavity interposed between the inlet passage and the outlet passage and extending along the movement direction (L) so as to face towards the shutter; said through cavity comprising a further inlet passage in fluid communication with the inlet passage, and a further outlet passage in fluid communication with the outlet passage; said further inlet passage and said further outlet passage being arranged along the movement direction (L) transversally to the inlet passage and the outlet passage arranged along the sliding direction (S).

15. The valve according to claim 14, further comprising a movement member for moving the shutter along the movement direction (L) and operatively associated with the shutter for moving it from the closed position towards the open position, wherein the movement member is inserted in the through cavity to allow the movement of the movement member along the movement direction (L).

16. A valve comprising two stages, wherein at least a first stage comprises the characteristics of the valve according to claim 1.

17. A valve comprising two stages, wherein at least a first stage comprises the characteristics of the valve according to claim 14, wherein a second stage comprises a further shutter movable along the movement direction (L) between a locked position, in which it disables the passage of fluid between the through cavity and the outlet opening, and a sliding position, in which it is distanced from the further outlet passage to allow the fluid to reach the outlet opening.

18. The valve according to claim 17, comprising a movement member for moving the shutter along the movement direction (L) and operatively associated with the shutter for moving it from the closed position towards the open position, wherein the movement member is operatively active on both shutters and is configured to move the shutter and the further shutter.

19. The valve according to claim 17, comprising a movement member for moving the shutter along the movement direction (L) and operatively associated with the shutter for moving it from the closed position towards the open position, and
- a second magnet operatively active between a fixed portion of the valve and the movement member for moving the movement member itself along the movement direction (L), wherein the movement member comprises a rod-shaped body passing through the further shutter and a ferromagnetic portion interacting with the second magnet.

20. The valve according to claim 17, comprising:
- a movement member for moving the shutter along the movement direction (L) and operatively associated with the shutter for moving it from the closed position towards the open position,
- a second magnet operatively active between a fixed portion of the valve and the movement member for moving the movement member itself along the movement direction (L), and
- a first electromagnetic circuit operatively connected to the first magnet and a second electromagnetic circuit operatively connected to the second magnet; said first electromagnetic circuit and said second electromagnetic circuit being independent from each other so that the movement along the movement direction (L) of the further shutter is independent from the movement of the shutter along the movement direction (L).

* * * * *